(12) United States Patent
Gorelik et al.

(10) Patent No.: US 10,701,182 B2
(45) Date of Patent: Jun. 30, 2020

(54) CREATING NEW VERSIONS OF PROVISIONING SERVICE TEMPLATES

(71) Applicant: INTERNATIONAL BUSINESS MACHINES CORPORATION, Armonk, NY (US)

(72) Inventors: Galina Gorelik, Hyde Park, NY (US); Hiren Shah, Highland, NY (US); Michael J. Snihur, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 15/473,681

(22) Filed: Mar. 30, 2017

(65) Prior Publication Data

US 2018/0287865 A1   Oct. 4, 2018

(51) Int. Cl.
*H04L 29/06* (2006.01)
*H04L 29/08* (2006.01)
*H04L 12/24* (2006.01)
*G06F 8/36* (2018.01)

(52) U.S. Cl.
CPC ............... *H04L 67/34* (2013.01); *G06F 8/36* (2013.01); *H04L 41/5048* (2013.01); *H04L 41/0859* (2013.01); *H04L 41/5096* (2013.01); *H04L 67/10* (2013.01)

(58) Field of Classification Search
CPC .................................................. H04L 41/0803
See application file for complete search history.

(56) References Cited

U.S. PATENT DOCUMENTS

| 7,496,890 | B2 | 2/2009  | Miller et al. |
| 7,779,389 | B2 | 8/2010  | Markov et al. |
| 7,954,087 | B2 | 5/2011  | Zenz et al. |
| 8,266,616 | B1 | 9/2012  | Jacqout et al. |
| 8,589,916 | B2 | 11/2013 | Gao et al. |
| 9,276,942 | B2 | 3/2016  | Srinivasan et al. |

*Primary Examiner* — Adnan M Mirza
(74) *Attorney, Agent, or Firm* — Cantor Colburn LLP; William Kinnaman

(57) ABSTRACT

A method includes creating a first version of a middleware provisioning service template. The first version includes a plurality of system resource definitions and security definitions. The method also includes publishing the first version. The method further includes creating a second version of the middleware provisioning service template and inheriting from the first version to the second version all of the system resource definitions and security definitions.

20 Claims, 12 Drawing Sheets

CREATING NEW VERSIONS OF PROVISIONING SERVICE TEMPLATES

BACKGROUND

This disclosure relates in general to configuring computing entities. More specifically, this disclosure relates to configuring cloud provisioning entities.

"Provisioning" generally relates to a configuring, managing, and providing of software and/or computing services. In the context of a cloud provisioning environment, a cloud provisioning server can configure, provide, and manage software and/or computing services that are allocated to an end user/consumer. Software and services are provisioned to end users by providing the end users with instantiations ("instances") of the software and services.

SUMMARY

According to one or more embodiments, a method includes creating a first version of a middleware provisioning service template. The first version includes a plurality of system resource definitions and security definitions. The method also includes publishing the first version. The method further includes creating a second version of the middleware provisioning service template and inheriting from the first version to the second version all of the system resource definitions and security definitions.

According to one or more embodiments, a computer system includes a memory having computer readable instructions. The computer system also includes a processor system communicatively coupled to the memory. The processor system is configured to execute the computer readable instructions including creating a first version of a middleware provisioning service template. The first version includes a plurality of system resource definitions and security definitions. The method also includes publishing the first version. The method further includes creating a second version of the middleware provisioning service template and inheriting from the first version to the second version all of the system resource definitions and security definitions.

According to one or more embodiments, a computer program product including a computer-readable storage medium is provided. The computer-readable storage medium has program instructions embodied therewith. The computer-readable storage medium is not a transitory signal per se, the program instructions readable by a processor system to cause the processor system to perform a method. The method includes creating a first version of a middleware provisioning service template. The first version includes a plurality of system resource definitions and security definitions. The method also includes publishing the first version. The method further includes creating a second version of the middleware provisioning service template and inheriting from the first version to the second version all of the system resource definitions and security definitions.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
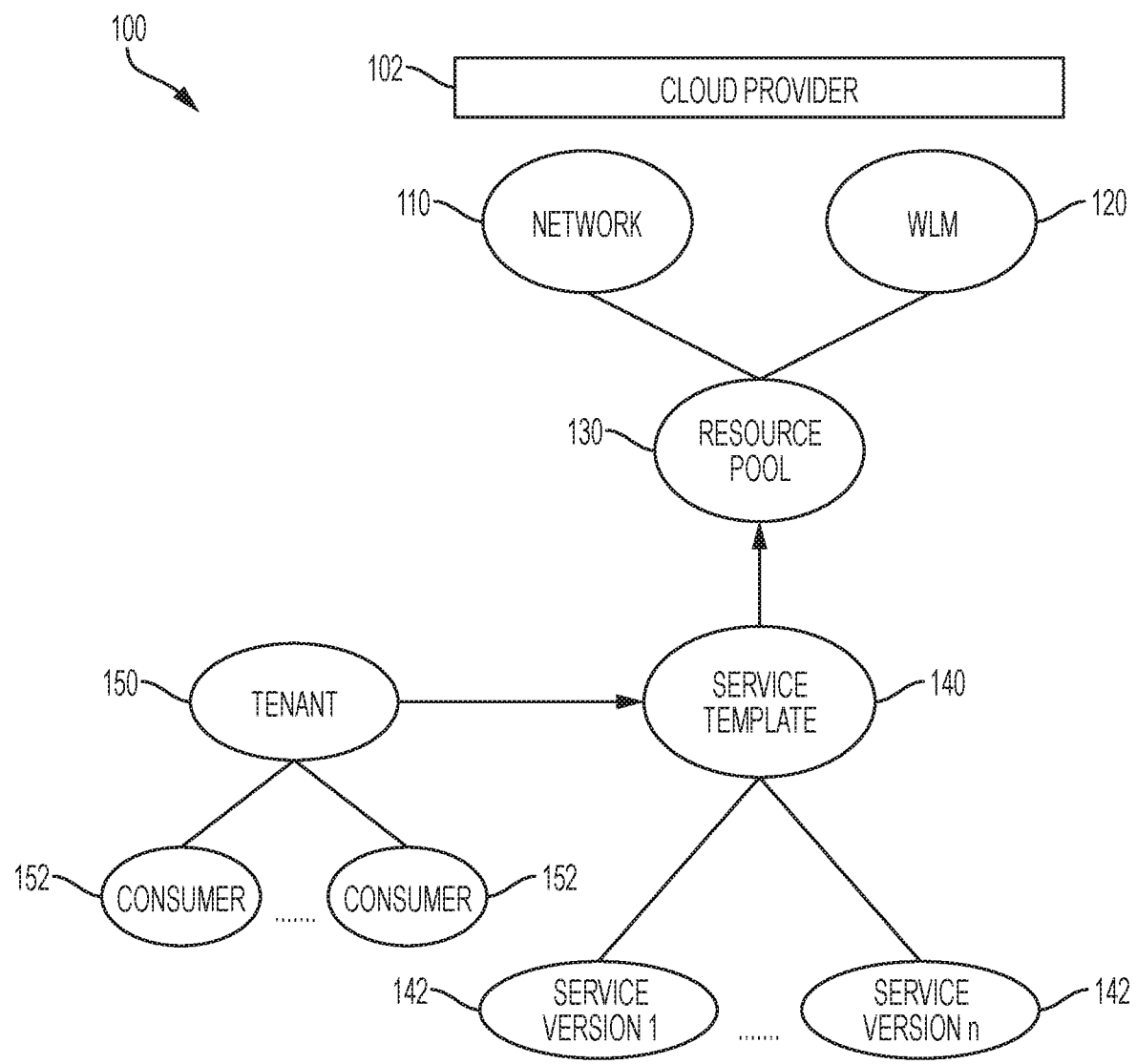
FIG. 1 depicts provisioning entities in a cloud domain, in accordance with an embodiment.

One or more embodiments can include methods and computer program products for configuring and naming of cloud provisioning entities. Various embodiments are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

It is also understood in advance that although this disclosure includes a detailed description on cloud computing, implementation of the teachings recited herein are not limited to a cloud computing environment. Rather, one or more embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With one or more embodiments, a cloud provider can perform pooling of computing resources, and the cloud provider can serve multiple consumers/users with the pooled computing resources. For example, multiple consumers/users can be served in accordance with a multi-tenant model, where each consumer/user can correspond to a tenant. The cloud provider may choose to isolate certain tenants to specific resource pools, or the cloud provider may build an Infrastructure as a Service (IaaS) infrastructure in order configure multiple tenants as using a same resource pool.

With the current approaches of implementing cloud environments, in order for a cloud provider to provide services to a customer, the cloud provider provides the customer with a partition of memory/hardware (i.e., resources) that is specifically dedicated to the customer, where only the customer can access this dedicated partition of memory/hardware. Next, the cloud provider installs an operating system on the dedicated partition for the customer. If other customers have their own dedicated partitions, then the cloud provider separately installs operating systems on the other dedicated partitions for these other customers. Next, after the cloud provider installs the operating system for the customer, the cloud provider can execute instances of services for the customer. As such, because customers are isolated from each other due to their separate partitions of hardware, the current approaches implement isolation between customers at the hardware level.

In contrast to the current approaches, one or more embodiments can implement isolation between customers at a different level, such as at the operating system level, for example. For example, an embodiment provides a method where different customers/tenants can use a shared hardware and a shared operating system. The shared operating system can implement isolation between customers/tenants, as described in more detail below.

An embodiment enables a cloud provider to run/implement multiple disparate cloud services for different tenants/customers, with different service levels for those cloud services, with a high level of isolation among the implemented cloud services. In view of the above, one or more embodiments enable automatic provisioning of cloud services for multiple consumers/tenants and their workloads.

In the multi-tenancy model of one or more embodiments, multiple tenants can use the same operating system or the same pool of system resources, while still preserving the necessary isolation between tenants. For example, although multiple tenants can use resources from the same pool of system resources, the specific resources that are used by each tenant may or may not be shared by other tenants, depending upon whether isolation between tenants is necessary.

FIG. 1 depicts provisioning entities in a cloud domain 100, in accordance with one or more embodiment. The cloud domain 100 comprises one or more of: a service template 140. A service template 140 can have one or more version 142. The cloud domain 100 comprises one or more of: tenant 150. A tenant 150 is comprised of one or more consumers 152 and one or more resource pool 130. The resource pool 130 includes the workload manager pool 120 (i.e. memory, processor, etc.) and network pool 110. For each service template 140 associated with a tenant 150, there is a single resource pool 130 from which the network 110 and workload manager resource 120 are allocated.

A cloud provider 102 can generally be considered to be an entity that manages a cloud domain 100. The cloud provider 102 of a specific cloud domain 100 is responsible for defining the service templates 140, tenants 150, and resource pools 130 for the cloud domain 100. The cloud provider 102 can manage the relationships across tenants 150, service templates 140, and resource pools 130.

A cloud domain 100 can generally be a partitioned management scope for tenants 150, service templates 140, and resource pools 130, where the management scope can be partitioned into functional groups. A tenant 150 can generally be a scope that shares certain resources. A tenant 150 can include a consumer 152 or a group of consumers 152 that have been granted use of specified services and associated resources in a cloud domain 100, as described in more detail below. The cloud provider 102 of a specific cloud domain 100 can define and manage the tenants 150 of the specific cloud domain 100.

Multiple consumers 152 will use the same resource pool 130 while still being isolated from resource pool 130 associated with other tenants 150. With certain embodiments, the overall pool of system resources can be divided into smaller resource pools 130 that can be tenant-specific or that can be shared across different tenants 150, depending on whether isolation between different tenants 150 is necessary. A resource pool 130 can generally be a high-level pool of computing resources that can be referenced in order to help define multi-tenant isolation scopes for shared resources within a cloud domain 100. The cloud provider 102 of a specific cloud domain 100 can define and manage a resource pool 130 for specific tenants 150 and service templates 140.

Although certain embodiments can configure tenants 150 in the same cloud domain 100 to share resources from the same pool of system resources, other embodiments can also isolate tenants 150 even when the tenants are in the same cloud domain 100. Tenants 150 (within the same cloud domain 100) can be isolated from each other by configuring resources pools 130 that are tenant-specific.

A service template 140 is a customized software as a service template. The service templates 140 may be used for middleware provisioning of software and/or services. Each cloud domain 100 has its own set of services available in that domain. The cloud provider 102 defines and manages the service in a specific cloud domain 100. The cloud provider 102 also associates service template to appropriate tenants 150. Service templates 140 can be used within cloud domains 100 to provision software or services to tenants 150. A cloud domain 100 can use one or more service templates 140 to provision software or services for tenants 150. When provisioning software or services using the service templates 140, corresponding resources can be obtained from a resource pool 130. A service template version 140 is specific to the level of code libraries delivered with the version of middleware. The consumers 152 of tenants 150 can then use the provisioned software or services. A consumer 152 can generally be a user that has been given access to tenant-specific services and resource pools 130. The consumer 152 can provision service instances and can manage the life cycles of service instances.

When a service is provisioned for the consumer 152, embodiments can perform dynamic mapping that determines which resource pool 130 that the resources will be obtained from, based on the consumer's relationship to the underlying tenant 150. Embodiments can provide a necessary flexibility and scalability for implementing a robust multi-tenant cloud platform. Embodiments can also implement a security authorization method that allows efficient management of a population of cloud providers, tenants, consumers, and associated cloud services.

The cloud provider 102 can create, test, and/or manage service templates 140 for a cloud domain 100. The cloud provider 102 can also create or delete a tenant 150. The cloud provider 102 can also add or remove a service template 140 to/from a defined tenant 150 group, where consumers 152 within the defined tenant 150 group are authorized to provision services from the service template 140. The cloud provider 102 can also configure a resource pool 130 for the service template 140 and set up an entitlement policy for a tenant 150 group, where the entitlement policy identifies the number of service instances that can be provisioned by the tenant 150 group. The entitlement policy can also identify how many instances each consumer 152 can provision. The cloud provider 102 can also manage a consumer 152 of a tenant 150. A user that corresponds to a cloud provider 102 can create tenant 150 groups and connect consumers 152. This ability allows cloud providers 102 to manage service definitions in resource pools within tenants 150. This group structure also enables resource isolation across different cloud domains 100 and across various tenants 150.

Typically when a new version/release of a middleware product is installed by a service provider, the middleware provisioning service needs to be updated to use newer code libraries delivered with new release of middleware product. Such updates to middleware provisioning service leads to publishing a new service template 140. As part of publishing the new service template 140, the cloud provider 102 has to define resource pools 130 for system resources (e.g. network, performance, storage etc.) and permit all the existing tenants 150 and consumers 152 to this new version of middleware provisioning service template 140. The cloud provider 102 has to work with system administrators to define resource pools and security administrators to build appropriate security rules and permission. This activity is time consuming and due to human intervention can be error prone. Consumers 152 of the middleware service template 140 need to be also informed about new service for latest release of the middleware.

An embodiment enables new service templates 140 to inherit all of system resource definitions and security definitions from existing middleware provisioning service templates 140. Allowing the system resource definitions and security definitions to be inherited speeds up service definition process and minimizes impact to consumers 152 of the middleware services.

Figure 2A:
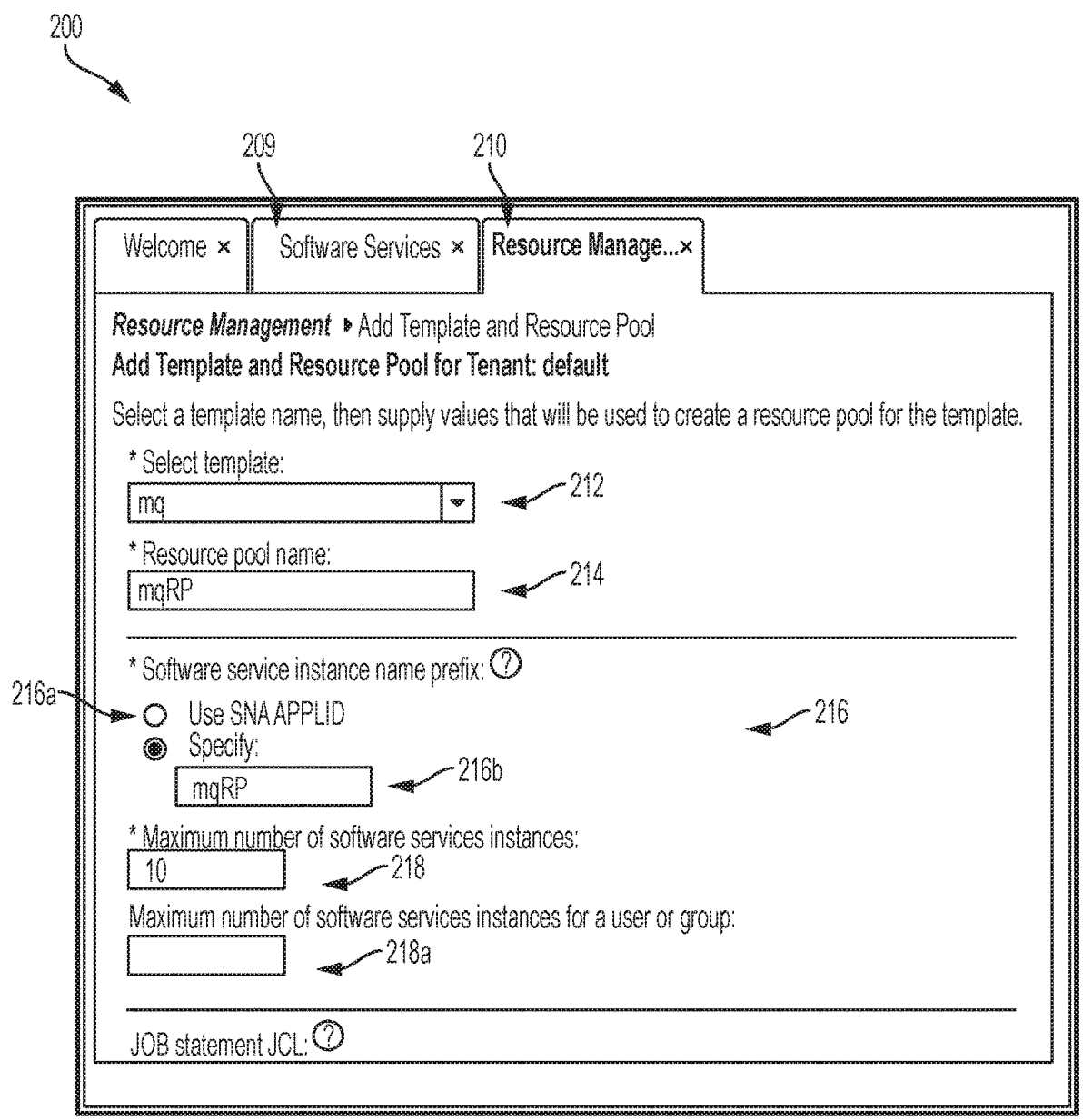
FIG. 2A-2H depicts a screen display that may be generated by a computer system via a graphical user interface, in accordance with an embodiment.
Figure 2B:
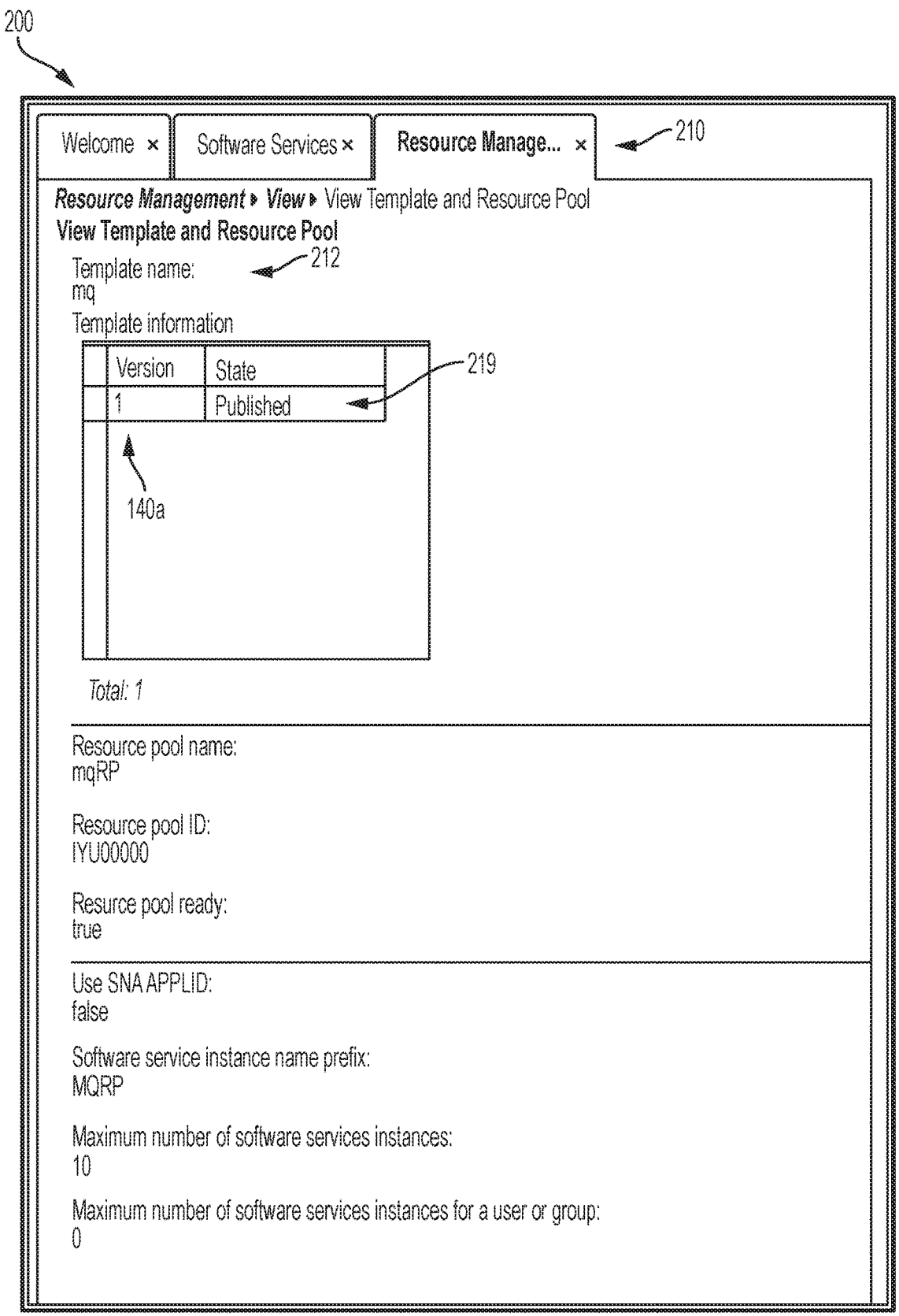
Figure 2C:
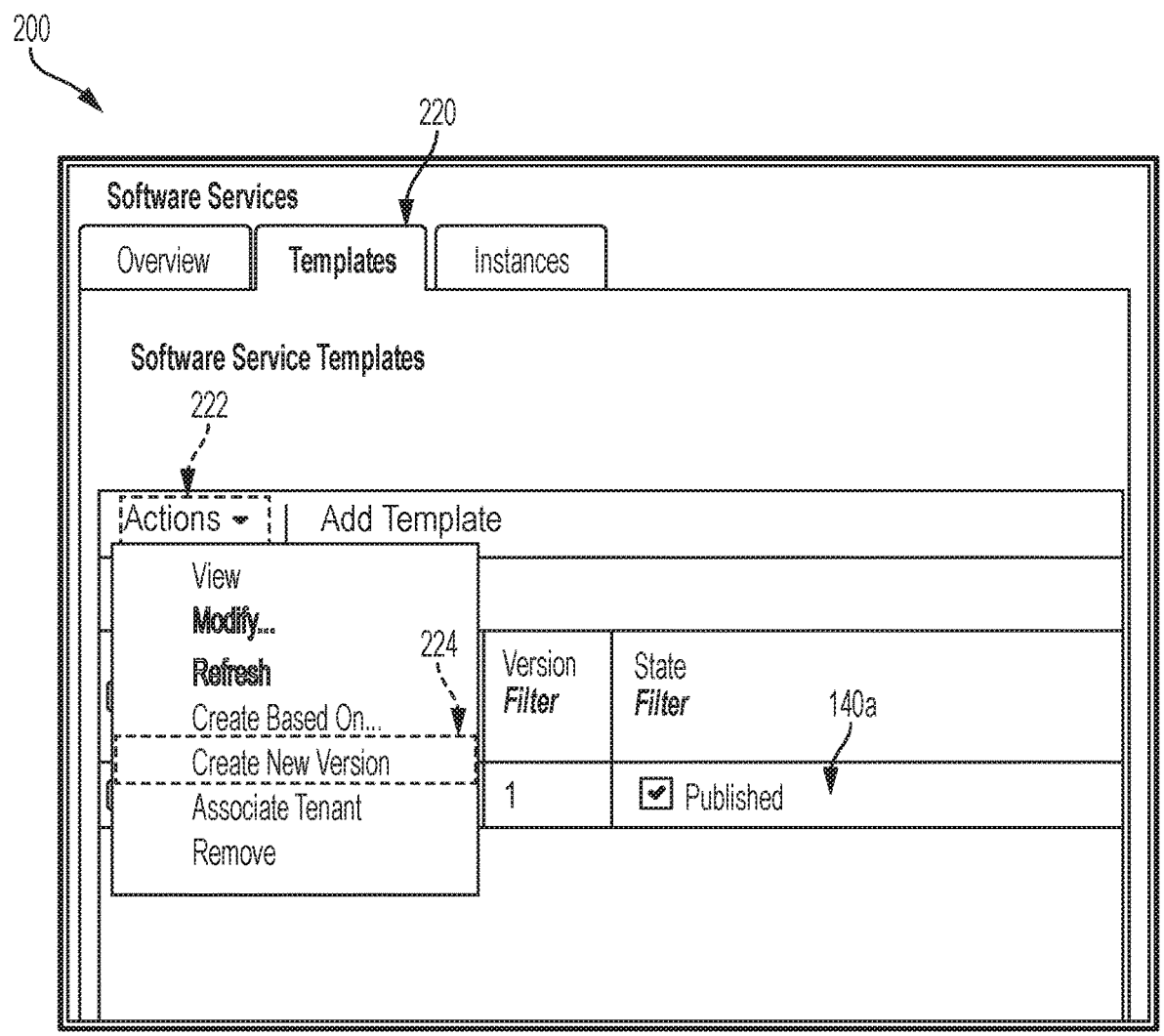

FIG. 2A shows a schematic screen shot that depicts an embodiment of a screen display 200 that may be generated by a computer system via a graphical user interface. The graphical user interface can further comprise a software services templates 220 tab (see FIG. 2C) utilized by a cloud provider 102 for creating a first service template 140*a*. The graphical user interface can further comprise the resource manager 210 utilized by a cloud provider 102 for associating the first service template 140*a* to the tenant 150, at this time the resource pool 130 is also created. The association is based on the name of the service template 140. A tenant 150 is also authorized to use the first service template 140*a* by granting access to the tenant 150 in the security profile associated with the first service template 140*a*. FIG. 2A shows the association of the first service template 140*a* named "mq" to a tenant 150. The service template 140 named "mq" 212 is selected. A resource pool name 214 is also input. The "software service instance name prefix" 216 is selected. The tenant 150 is given the option to "use SNA APPLID" 216*a* for the "software service instance name prefix" of specify 216*b* a "software service instance name prefix". The resource manager 210 also allows the tenant 150 to a "maximum number of software services instances" 218 and a "maximum number of software services instances for a user or group" 218*a*. FIG. 2*b* shows what the resource manager 210 looks like when the service template 140 is completed. The template name 212 "mq" is shown and the state 219 of the template indicates that the template "mq" has been published.

Figure 2D:
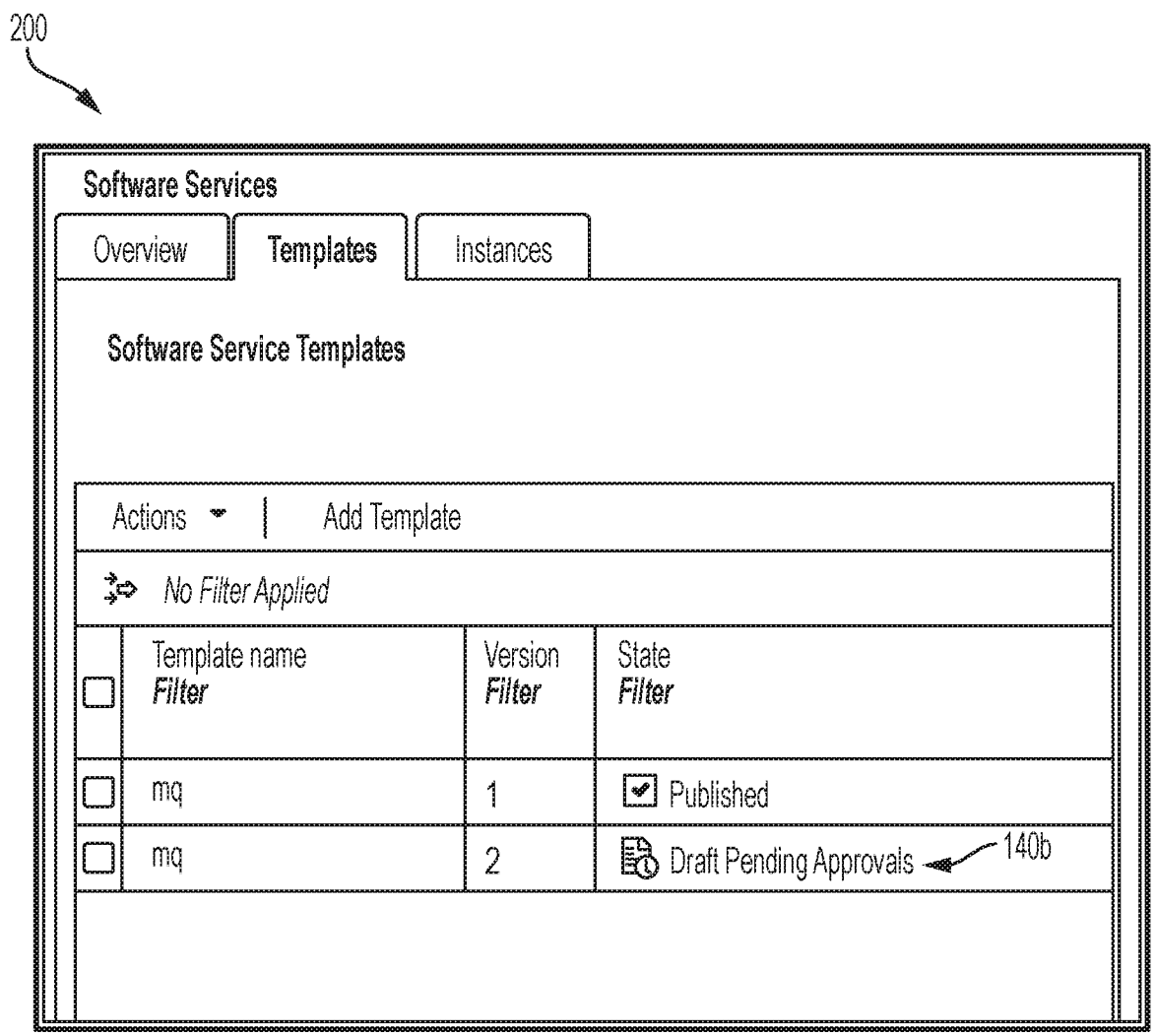
Figure 2E:
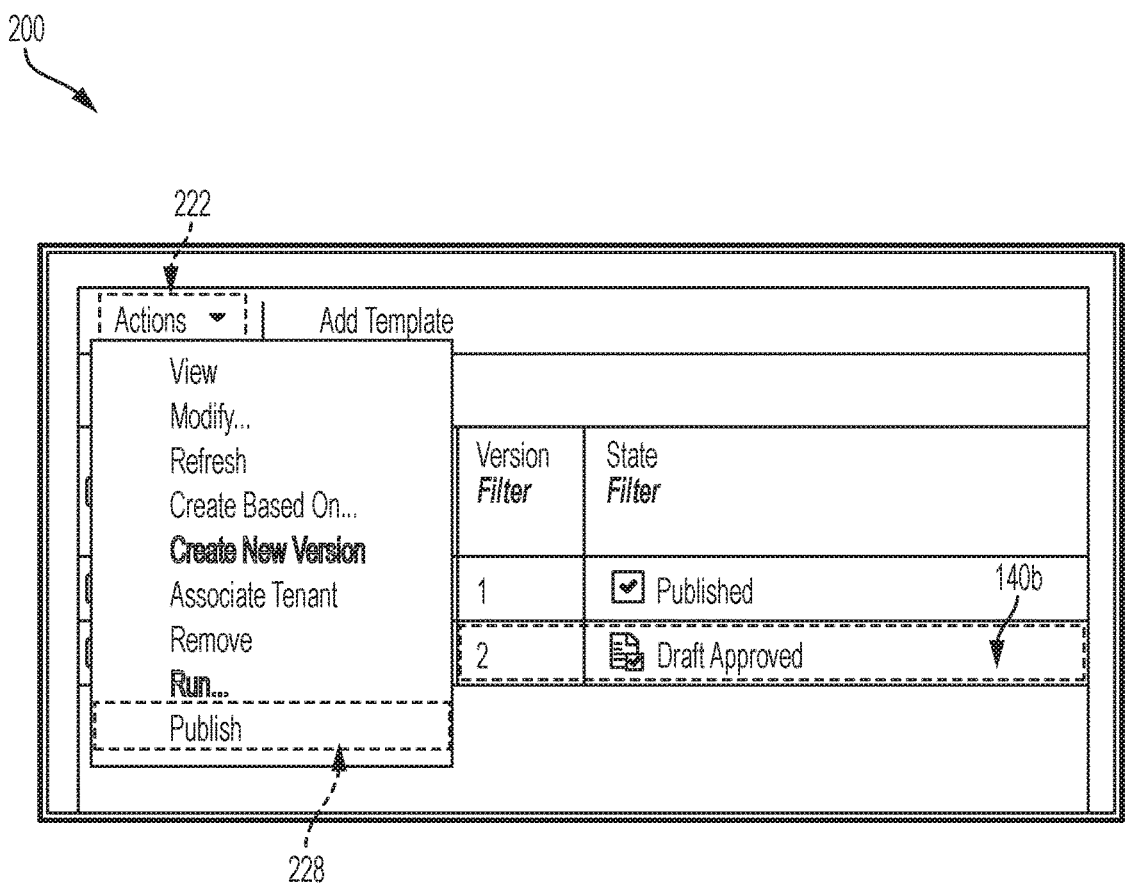

FIG. 2C-2F show how a cloud provider 102 creates a second version 140*b* of a template 140 from an existing published service template 140(i.e., the first version 140*a*) with a click of a button (i.e., mouse click, touch screen..etc). FIG. 2C-2F shows a schematic screen shot that depicts an embodiment of a screen display 200 that may be generated by a computer system via a graphical user interface. The graphical user interface can further comprise a software services templates 220 tab. On the software services templates 220 tab a cloud provider 102 may select the first version 140*a* then select actions 222 and select "create new version" 224. As shown in FIG. 2D, the new version of the template 140*b* is created as version "2" and is kept as a draft pending approval. The second version 140*b* preserves the template name "mq". By reusing the name "mq", the second version 140 inherits the tenant association, resource pool definition, and the security profile that were created for the original service template version. All the consumers 152 who had access to the first version 140*a* will have access to the second version 140*b* once the second version 140*b* is published. FIG. 2E shows that once the cloud provider 102 is satisfied with the second version 140*b*, the second version 140*b* will be published. The cloud provider 102 publishes the second version 140*b* by selecting the second version 140*b*, then selecting actions 222 and "publish" 228.

Figure 2F:
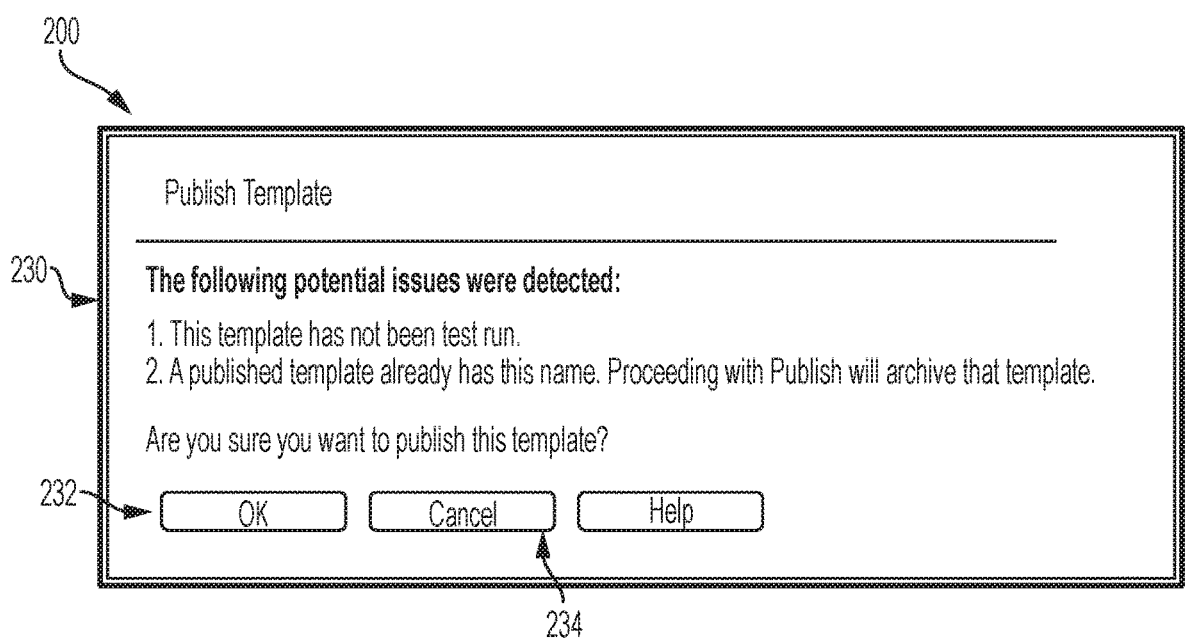
Figure 2G:
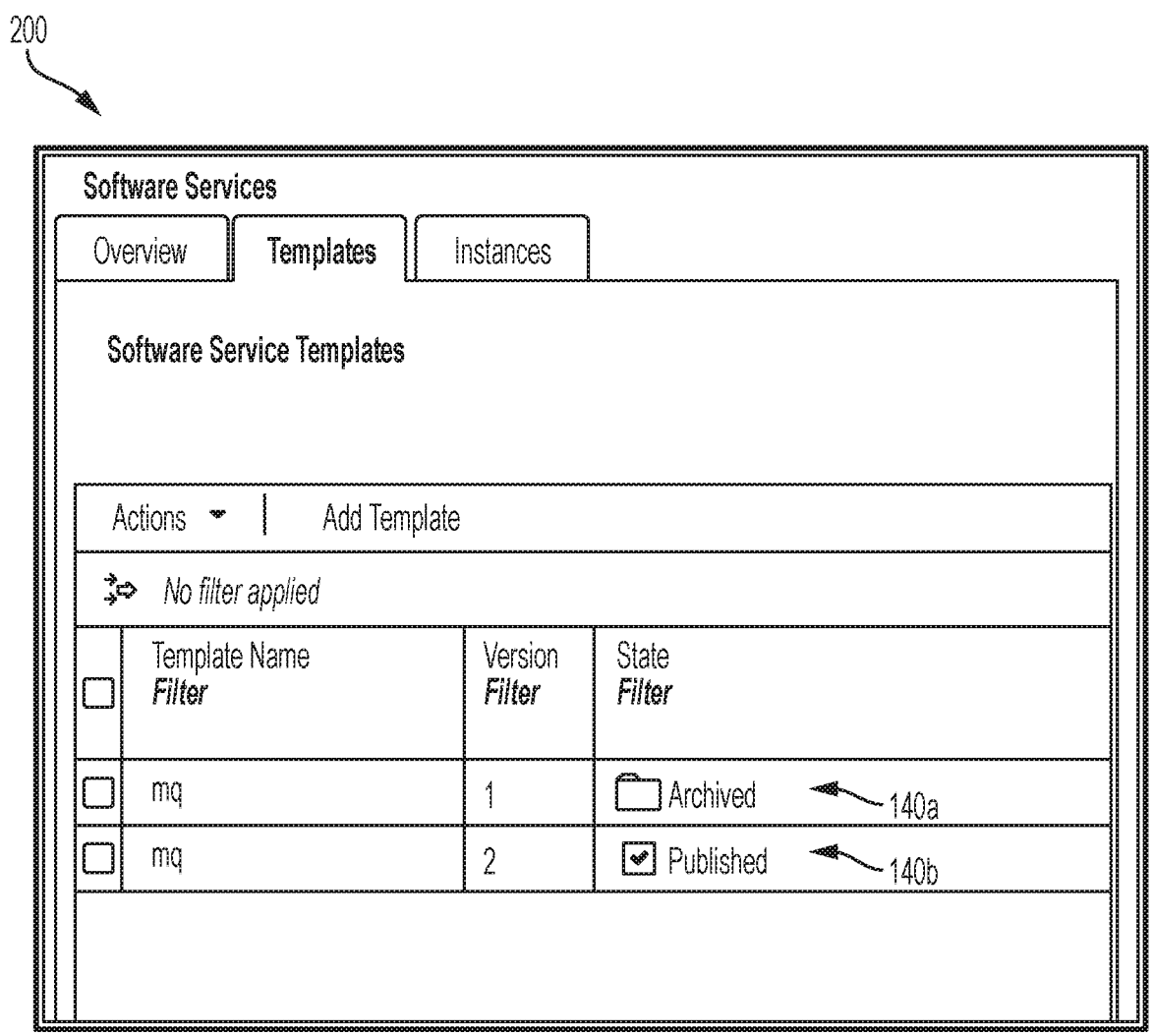

As FIG. 2F shows, once "publish" 228 is selected, a warning 230 may be generated on the screen display by a computer system via a graphical user interface. The warning 230 may display "This template has not been test run" and "a published template already has this name. Proceeding with publish will archive that template." The cloud provider 102 will confirm they want to continue by clicking "OK" 232 or "cancel" 234 if they do not want to continue. Once the cloud provider 102 clicks "OK" 232, the second version 140*b* is published and the first version 140*a* is archived as seen in FIG. 2G.

Figure 2H:
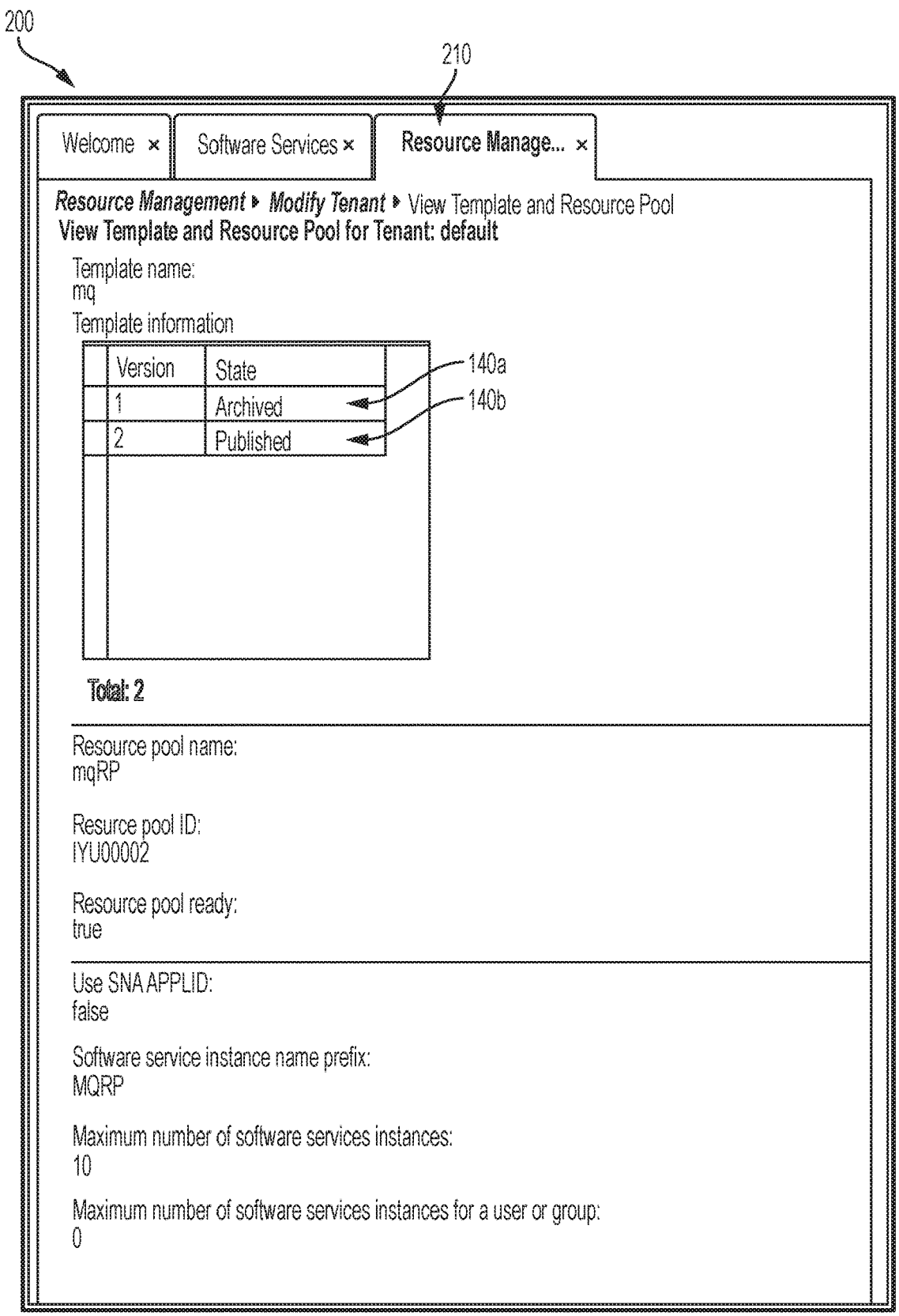

FIG. 2H shows an updated view of the resource pool in the resource manager 210 after the second version 140*b* is published. All the tenants 150 that were associated with the first version 140*a* of the service template, will automatically be associated with the second version 140*b* of the service template. The ability of consumers 152 to provision service instances is not impacted by the switch in the version of the service template. The subscription requests are done via the name of the service template 140 and the underlining orchestration uses the name of the service template for the tenant association and is agnostic from the service template version. The resources obtained for provisioning of the second version 140*b*, come from the same resource pool 130 associated with tenant 150 that was used for the first version 140*a*.

Figure 3:
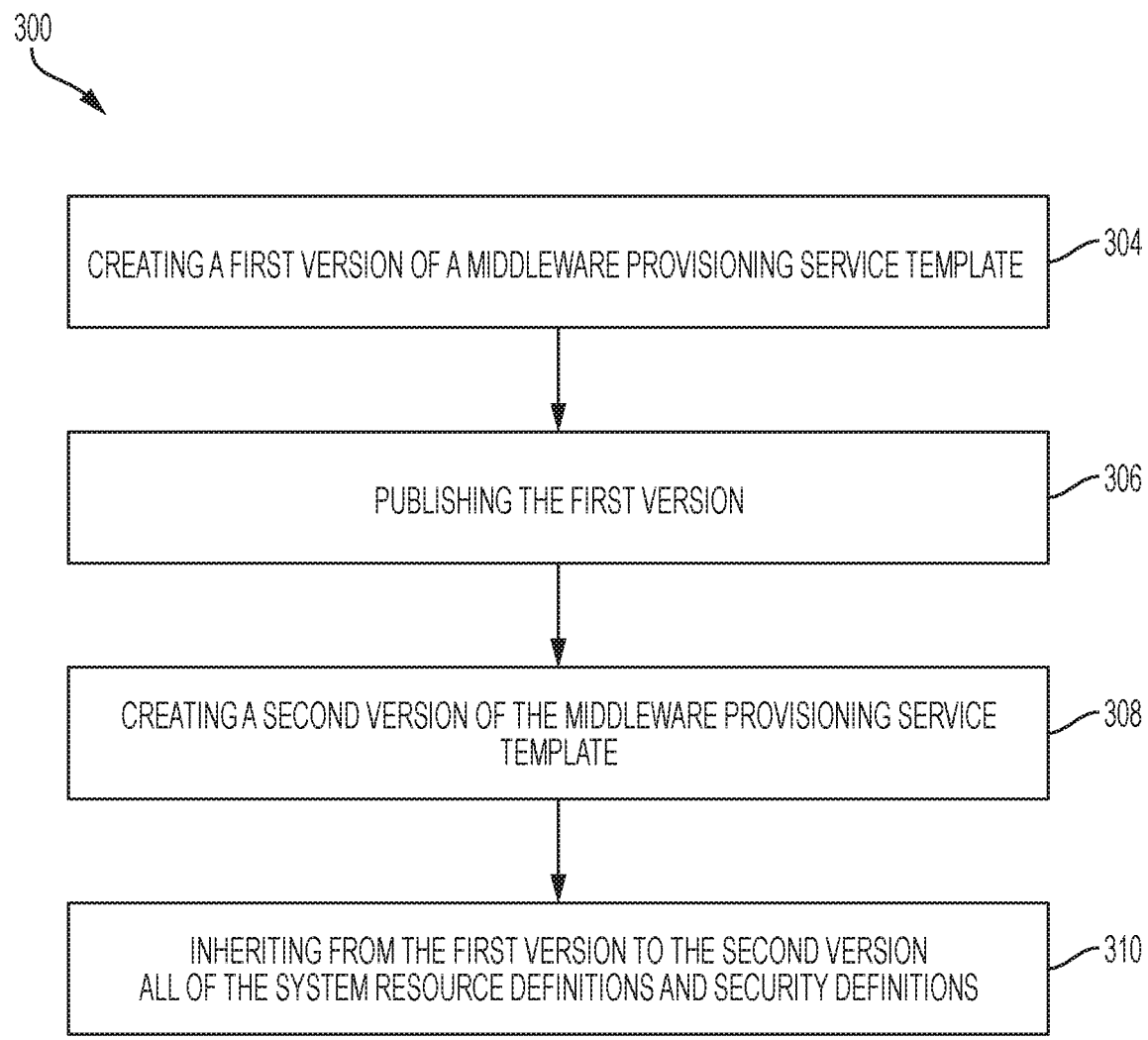
FIG. 3 depicts a flowchart of a method in accordance with one or more embodiment.

FIG. 3 depicts a flowchart of a method 300 in accordance with one or more embodiments. The method 300 can be performed by a provisioning server, for example. In another embodiment, the method 300 can be performed by a server or computing device of the end user, for example. The method 300 includes, at block 304, creating a first version 140*a* of a middleware provisioning service template 140. The first version 140*a* includes a plurality of system resource definitions and security definitions. At block 306, the first version 140*a* is published. At block 308, a second version 140*b* of the middleware provisioning service template 140 is created. At block 310, to create the second version 140*b*, the second version 140*b* inherits from the first version 140*a* all of the system resource definitions and security definitions. The method 300 may comprise of archiving the first version 140*a* and publishing the second version 140*b*. The method 300 may also comprise provisioning an instance for a consumer 152 using the first version 140*a* prior to creating the second version 140*b*. The method 300 may further comprise provisioning an instance for the consumer 152 using the second version 140*b* after the second version 140*b* is published. The first version 140*a* uses a resource pool 130 associated with a tenant 150 and then the second version 140*b* will use the same resource pool 130 when provisioning for the same consumer 152.

While the above description has described the flow process of FIG. 3 in a particular order, it should be appreciated that unless otherwise specifically required in the attached claims that the ordering of the steps may be varied and/or performed simultaneously.

Figure 4:
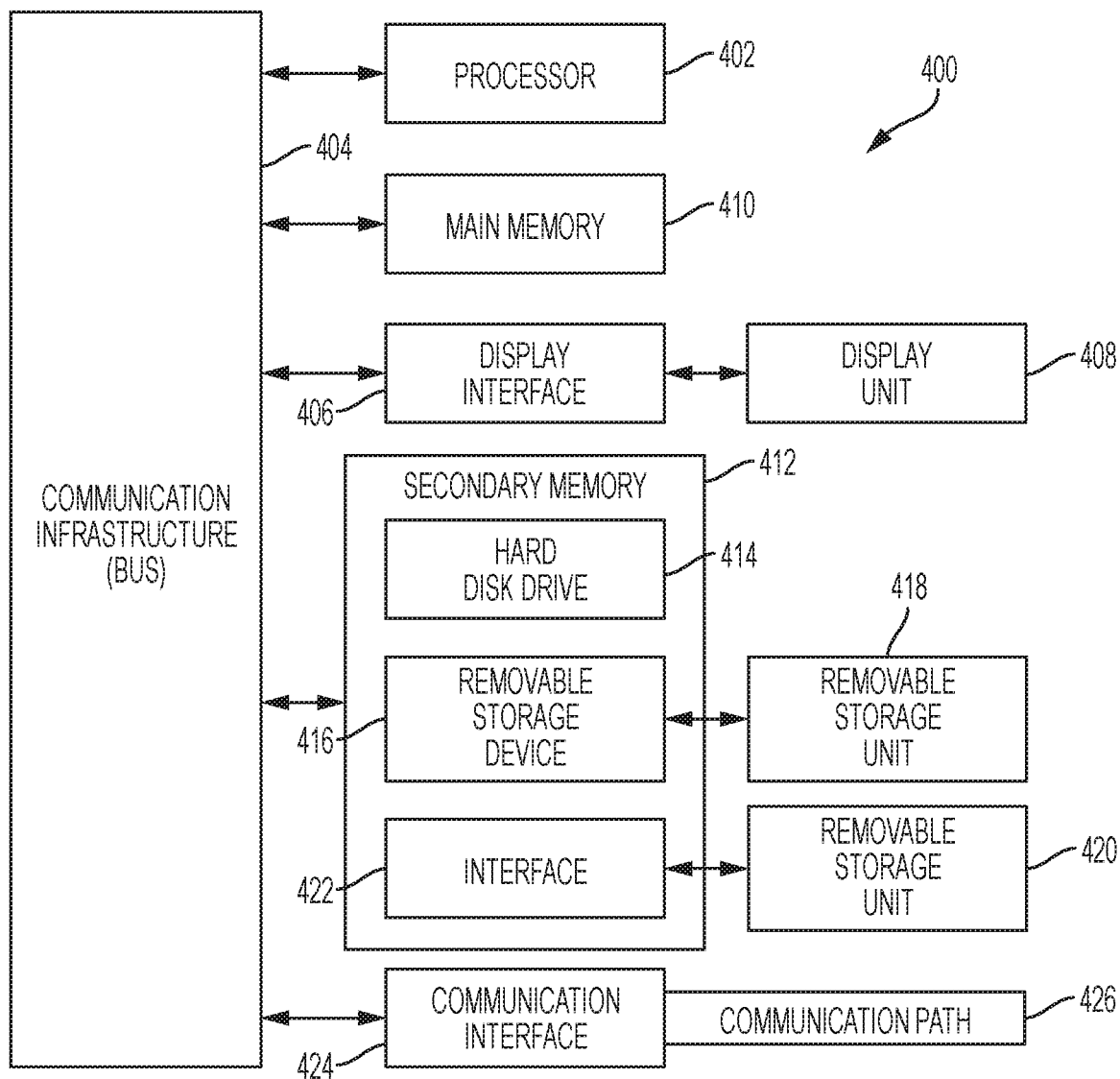
FIG. 4 depicts a high-level block diagram of a computer system, which can be used to implement one or more embodiments.

FIG. 4 depicts a high-level block diagram of a computer system 400, which can be used to implement one or more embodiments. Computer system 400 can correspond to, at least, a cloud provisioning server, a server of the end user, and/or a computing device of the end user. Computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system 400 and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system 400 to perform the features discussed herein. In particular, the computer programs, when run, enable processor 402 to perform the features of the computer system. Accordingly, such computer programs represent controllers of the computer system 400. Thus it can be seen from the forgoing detailed description that one or more embodiments provide technical benefits and advantages.

Figure 5:
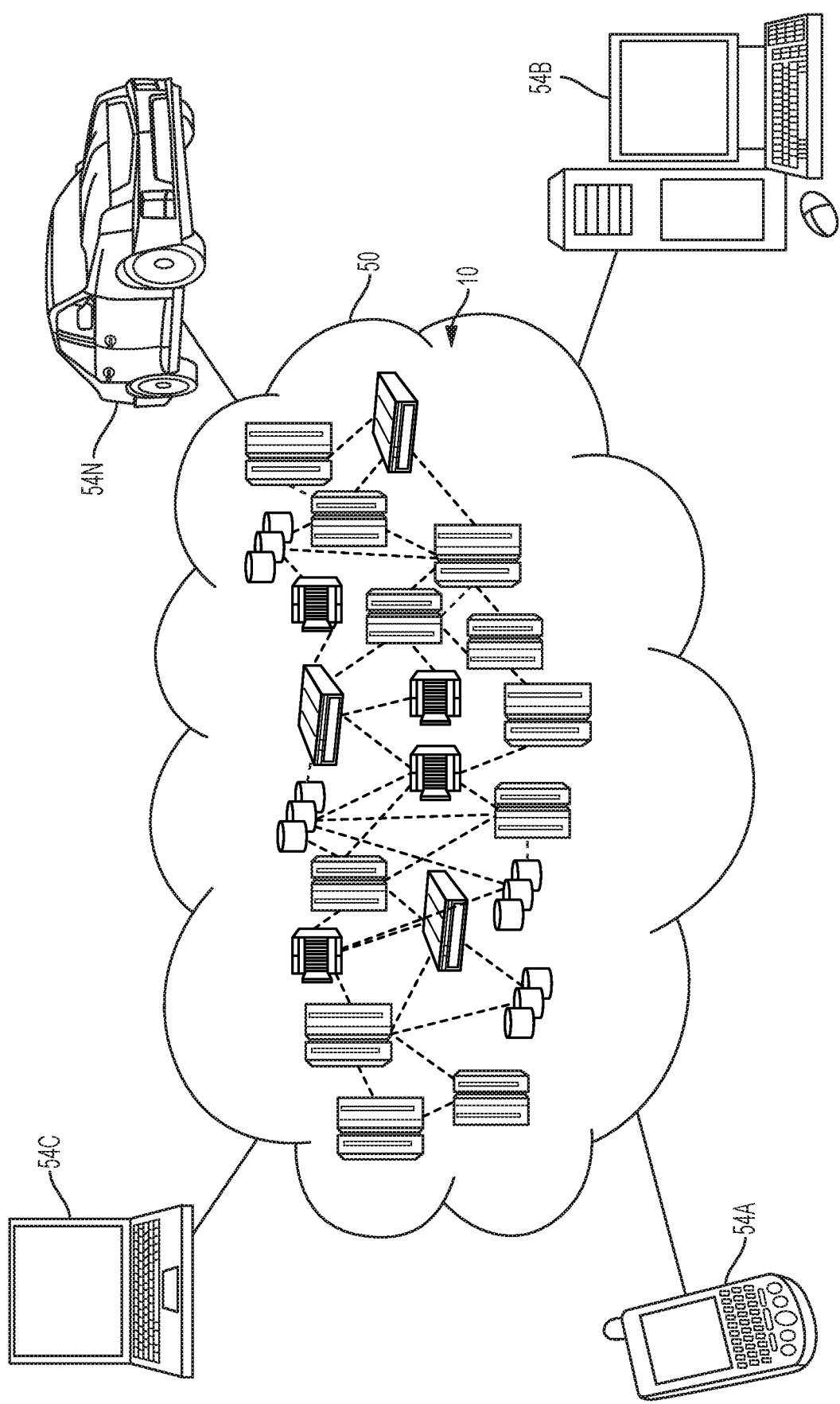
FIG. 5 depicts a cloud computing environment according to an embodiment.

FIG. 5 depicts a cloud computing environment according to an embodiment. Referring FIG. 5, illustrative cloud computing environment 50 is depicted. As described above, embodiments can be implemented within a cloud computing environment. A system (such as a provisioning server, for example) that performs the method of FIG. 3 can also be implemented within a cloud computing environment, for example. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
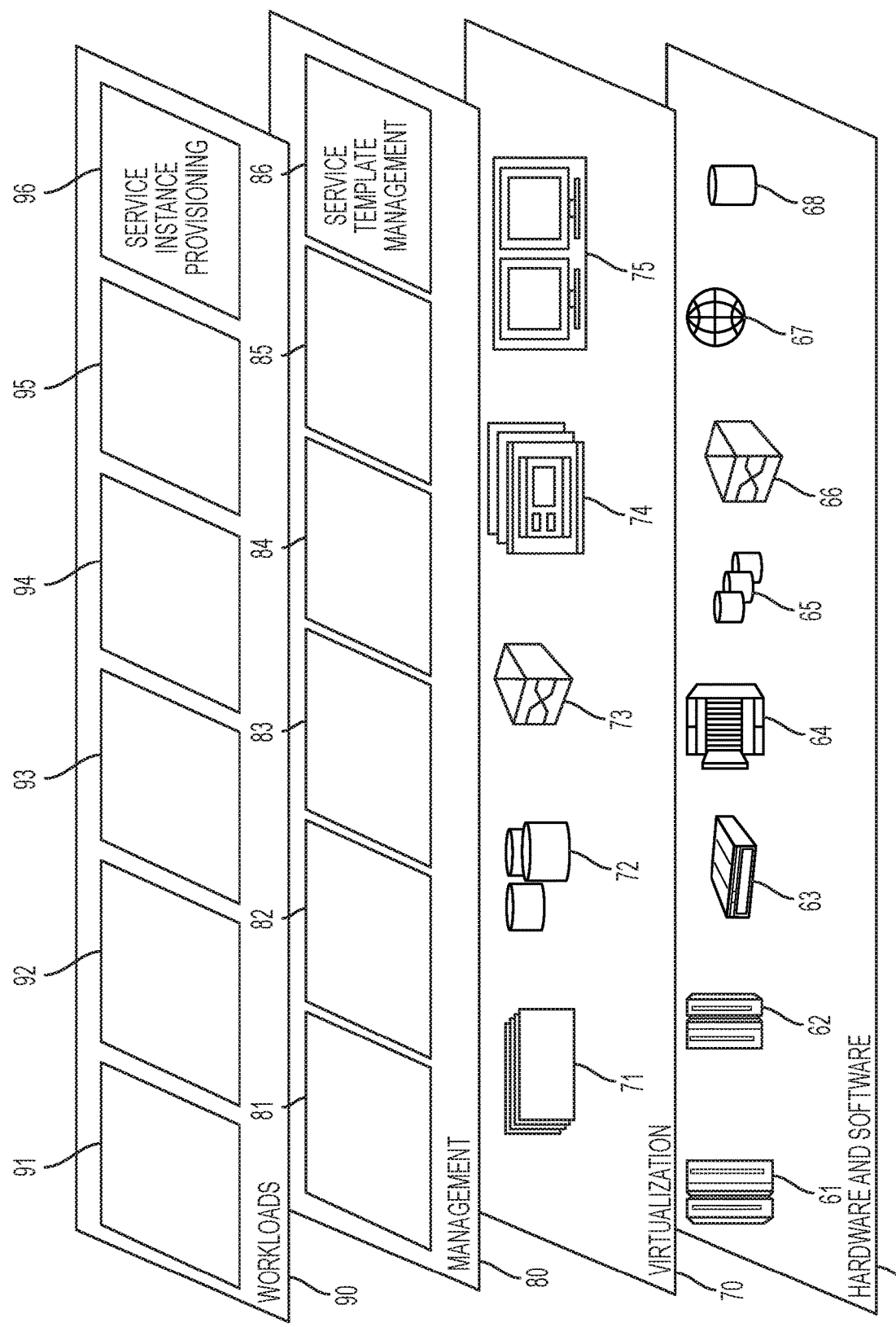
FIG. 6 depicts abstraction model layers according to an embodiment.

FIG. 6 depicts abstraction model layers according to an embodiment. Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Service template management 86 provides a mechanism to create service templates.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and service instance provisioning 96. As part of service instance provisioning 96, infrastructure dynamically maps the provisioning request to the resource pool defined for the tenant that the consumer is associated with. Resource provisioning 81 obtains computing resources from the dynamically determined resource pool.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, the method comprising:
    creating a first version of a provisioning service template for a middleware product, wherein the first version associates a first tenant, a plurality of system resource definitions, and security definitions;
    publishing the first version;
    creating, in response to installation of a new version of the middleware product, a second version of the provisioning service template for the new version of the middleware product,
    inheriting from the first version to the second version all of the system resource definitions and security definitions;
    associating, with the second version, a second tenant associated with the first version;
    performing a dynamic mapping to determine which resource pool that the second version provisions resources from for the first tenant and the second tenant based on a consumer's respective relationship with the first tenant and the second tenant; and
    upon receiving a first selection to publish the second version, delaying publishing the second version until a second subsequent selection to publish is received.

2. The computer implemented method of claim 1, further comprising archiving the first version.

3. The computer implemented method of claim 1, further comprising publishing the second version.

4. The computer implemented method of claim 3, wherein a consumer of the first version has access to the second version when the second version is published.

5. The computer implemented method of claim 3, further comprising provisioning an instance for a consumer using the second version after the second version is published.

6. The computer implemented method of claim 5, wherein the first version uses a resource pool associated with the first tenant, and the second version uses the same resource pool when provisioning.

7. The computer implemented method of claim 3, further comprising provisioning an instance for the consumer using the first version prior to creating the second version; and provisioning an instance for the consumer using the second version after the second version is published.

8. A computer system comprising:
    a memory having computer readable instructions; and
    a processor system communicatively coupled to the memory, the processor system configured to execute the computer readable instructions comprising:
        creating a first version of a provisioning service template for a middleware product, wherein the first version associates a tenant, a plurality of system resource definitions, and security definitions;
        publishing the first version;
        creating, in response to installation of a new version of the middleware product, a second version of the provisioning service template for the new version of the middleware product,
        inheriting from the first version to the second version all of the system resource definitions and security definitions;
        associating, with the second version, a second tenant associated with the first version; and performing a dynamic mapping to determine which resource pool that the second version provisions resources from for the first tenant and the second tenant based on a consumer's respective relationship with the first tenant and the second tenant; and upon receiving a first selection to publish the second version, delaying publishing the second version until a second subsequent selection to publish is received.

9. The computer system of claim 8, wherein the computer readable instructions further comprise archiving the first version.

10. The computer system of claim 8, wherein the computer readable instructions further comprise publishing the second version.

11. The computer system of claim 10, wherein a consumer of the first version has access to the second version when the second version is published.

12. The computer system of claim 10, wherein the computer readable instructions further comprise provisioning an instance for a consumer using the second version after the second version is published.

13. The computer system of claim 12, wherein the first version uses a resource pool associated with the first tenant, and the second version uses the same resource pool when provisioning.

14. The computer system of claim 10, wherein the computer readable instructions further comprise provisioning an instance for the consumer using the first version prior to creating the second version; and provisioning an instance for the consumer using the second version after the second version is published.

15. A computer program product comprising:
a computer-readable storage medium having program instructions embodied therewith, wherein the computer-readable storage medium is not a transitory signal per se, the program instructions readable by a processor system to cause the processor system to perform:
creating a first version of a provisioning service template for a middleware product, wherein the first version associates a tenant, a plurality of system resource definitions and security definitions;

publishing the first version;

creating, in response to installation of a new version of the middleware product, a second version of the middleware provisioning service template for the new version of the middleware product, inheriting from the first version to the second version all of the system resource definitions and security definitions;

associating, with the second version, a second tenant associated with the first version; and performing a dynamic mapping to determine which resource pool that the second version provisions resources from for the first tenant and the second tenant based on a consumer's respective relationship with the first tenant and the second tenant; and upon receiving a first selection to publish the second version, delaying publishing the second version until a second subsequent selection to publish is received.

16. The computer program product of claim 15, wherein the program instructions further comprise archiving the first version.

17. The computer program product of claim 15, wherein the program instructions further comprise publishing the second version.

18. The computer program product of claim 17, wherein a consumer of the first version has access to the second version when the second version is published.

19. The computer program product of claim 17, wherein the program instructions further comprise provisioning an instance for a consumer using the second version after the second version is published.

20. The computer program product of claim 19, wherein the first version uses a resource pool associated with the first tenant, and the second version uses the same resource pool when provisioning.

\* \* \* \* \*